(12) United States Patent
Park et al.

(10) Patent No.: US 9,143,678 B2
(45) Date of Patent: Sep. 22, 2015

(54) APPARATUS AND METHOD FOR PROCESSING LIGHT FIELD DATA USING A MASK WITH AN ATTENUATION PATTERN

(75) Inventors: Byung-Kwan Park, Seoul (KR);
Ghulam Ahmed Kirmani, Cambridge, MA (US); Ramesh Raskar, Cambridge, MA (US); Rohit Pandharkar, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 747 days.

(21) Appl. No.: 13/102,812

(22) Filed: May 6, 2011

(65) Prior Publication Data

US 2012/0057040 A1    Mar. 8, 2012

Related U.S. Application Data (60) Provisional application No. 61/333,543, filed on May 11, 2010.

(30) Foreign Application Priority Data

Apr. 1, 2011  (KR) .......................... 10-2011-0030259

(51) Int. Cl.
*H04N 5/228* (2006.01)
*H04N 5/232* (2006.01)
*H04N 5/225* (2006.01)
*G06T 7/00* (2006.01)
*H04N 13/00* (2006.01)

(52) U.S. Cl.
CPC .......... *H04N 5/23229* (2013.01); *G06T 7/0065* (2013.01); *H04N 5/2254* (2013.01); *G06T 2200/21* (2013.01); *G06T 2207/10052* (2013.01); *G06T 2207/20048* (2013.01); *G06T 2207/20212* (2013.01); *H04N 2013/0081* (2013.01)

(58) Field of Classification Search
CPC . H04N 9/045; H04N 9/735; H04N 2209/046; H04N 5/23212; H04N 5/2254; H01L 2924/00; H01L 27/14621; G02B 27/2214; G02B 7/34
USPC .................................................. 348/340, 342
See application file for complete search history.

(56) References Cited

U.S. PATENT DOCUMENTS

| | | | |
|---|---|---|---|
| 7,061,693 B2 | 6/2006 | Zalevsky | |
| 7,792,423 B2* | 9/2010 | Raskar et al. | 396/268 |
| 7,965,936 B2* | 6/2011 | Raskar et al. | 396/268 |
| 8,442,397 B2* | 5/2013 | Kang et al. | 396/268 |
| 2002/0141634 A1* | 10/2002 | Nishizaka et al. | 382/144 |

(Continued)

FOREIGN PATENT DOCUMENTS

| | | |
|---|---|---|
| JP | 2009-17079 | 1/2009 |
| KR | 10-2007-0073745 | 7/2007 |
| KR | 10-2009-0117399 | 11/2009 |

*Primary Examiner* — Twyler Haskins
*Assistant Examiner* — Carramah J Quiett
(74) *Attorney, Agent, or Firm* — NSIP Law (57) ABSTRACT

Provided are an apparatus and method for processing a light field image that is acquired and processed using a mask to spatially modulate a light field. The apparatus includes a lens, a mask to spatially modulate 4D light field data of a scene passing through the lens to include wideband information on the scene, a sensor to detect a 2D image corresponding to the spatially modulated 4D light field data, and a data processing unit to recover the 4D light field data from the 2D image to generate an all-in-focus image.

13 Claims, 10 Drawing Sheets

(56) References Cited

U.S. PATENT DOCUMENTS

| | | | |
|---|---|---|---|
| 2003/0117627 A1* | 6/2003 | Sato et al. | 356/401 |
| 2004/0265708 A1* | 12/2004 | Misaka | 430/5 |
| 2007/0229653 A1 | 10/2007 | Matusik et al. | |
| 2008/0187305 A1 | 8/2008 | Raskar et al. | |
| 2009/0279189 A1 | 11/2009 | Getman et al. | |
| 2009/0295829 A1 | 12/2009 | Georgiev et al. | |

* cited by examiner

APPARATUS AND METHOD FOR PROCESSING LIGHT FIELD DATA USING A MASK WITH AN ATTENUATION PATTERN

CROSS REFERENCE TO RELATED APPLICATION

This application claims the benefit under 35 U.S.C. §119 (e) of U.S. Provisional Patent Application No. 61/333,543, filed on May 11, 2010, and the benefit under 35 U.S.C. §119 (a) of Korean Patent Application No. 10-2011-0030259, filed on Apr. 1, 2011, both of the disclosures of which are incorporated herein by references for all purposes.

BACKGROUND

1. Field

The following description relates to an image processing technology, and more particularly to an apparatus and method for processing a light field image that is acquired and processed using a mask that spatially modulates a light field.

2. Description of the Related Art

Imaging systems that view only one image by taking a picture once are commercially available. Recently, research has been conducted on a plenoptic camera that may recombine the focus of the image. The plenoptic camera is also called a light field camera, and may use a microlens array (in general, a lenticular lens array) to capture information on 4-dimensional (4D) light fields for a scene. The plenoptic camera may provide users with a re-focusing function by changing a focus plane after taking a picture. In doing so, the plenoptic camera may generate a view variation in which the user experiences a view of a scene from various angles.

However, in the light field data acquisition method, the angular data corresponding to the direction of light and the spatial data corresponding to the number of sensor pixels may be acquired at the same time. Therefore, the method has a problem in that the resolution becomes deteriorated as much as the angular data. For example, when the required angular resolution size of a main lens is 12×12 (i.e., 144), the resolution of the acquired image is ¹⁄₁₄₄ times the resolution corresponding to the entire sensor pixels.

SUMMARY

In one general aspect, there is provided an apparatus for processing a light field image, the apparatus including a lens, a mask configured to spatially modulate four-dimensional (4D) light field data of a scene passing through the lens such that the spatially modulated 4D light field data includes wideband information of the scene, a sensor configured to detect a two-dimensional (2D) image corresponding to the spatially modulated 4D light field data, and a data processing unit configured to recover the 4D light field data from the 2D image, generate a high-resolution depth map based on the 4D light field data, and generate an all-in-focus image based on the 2D image and the high-resolution depth map.

The data processing unit may comprise a recovering portion configured to recover the 4D light field data from the 2D image, a depth map generating portion configured to generate a plurality of viewpoint images from the 4D light field data and generate a depth map from a plurality of the viewpoint images, a high-resolution depth map generating portion configured to generate a high-resolution depth map with respect to the depth map, and an all-in-focus image generating portion configured to generate an all-in-focus image which is focused in all positions based on the 2D image and the generated high-resolution depth map.

The all-in-focus image generating portion may determine a spatially varying modulation function based on the high-resolution depth map, and generate an all-in-focus image based on an inverted value of the spatially varying modulation function and the 2D image.

The data processing unit may further comprise a traditional image generating portion configured to generate a traditional image that is focused only at a certain depth through a reblurring process, based on the high-resolution depth map and the all-in-focus image.

The data processing unit may further comprise a high-resolution light field image generating portion configured to generate a high-resolution light field image based on the high-resolution depth map and the all-in-focus image.

The high-resolution light field image generating portion may generate a high-resolution light field image by shifting pixels of the all-in-focus image based on the depths of the pixels included in the high-resolution depth map.

The mask may have an attenuation pattern comprising unit patterns that are repeatedly formed to attenuate light.

The spatially varying modulation functions of the unit patterns forming the attenuation pattern may have non-singular characteristics, and the unit patterns may be formed such that at least half of the area of each unit pattern transmits light.

Each unit pattern may have a 7×7 pixel structure, and regions corresponding to second and fourth rows and second and fourth columns of each unit pattern may intercept light and the other regions may not intercept light.

The mask may comprise a transparent layer, and a metal layer disposed on the transparent layer, the metal layer comprising an attenuation pattern formed therein to attenuate the light passing through the transparent layer.

In another aspect, there is provided a method of processing a light field image, the method including detecting a two-dimensional (2D) image corresponding to four-dimensional (4D) light field data that is spatially modulated to include wideband information of a scene, using a mask configured to spatially modulate the 4D light field data of the scene and a sensor, recovering the 4D light field data from the 2D image, generating a high-resolution depth map based on 4D light field data, and generating an all-in-focus image using the 2D image and the high-resolution depth map.

The generating of the all-in-focus image may comprise determining a spatially varying modulation function based on the high-resolution depth map, and generating an all-in-focus image based on an inverted value of the spatially varying modulation function and the 2D image.

The method may further comprise generating a traditional image that is only focused at a certain depth through a reblurring process, based on the high-resolution depth map and the all-in-focus image.

The method may further comprise generating a high-resolution light field image based on the high-resolution depth map and the all-in-focus image.

The generating of the high-resolution light field image may further comprise generating a high-resolution light field image by shifting pixels of the all-in-focus image based on the depths of the pixels included in the high-resolution depth map.

In another aspect, there is provided an attenuation mask for an imaging apparatus, the attenuation mask including a transparent layer, and a metal layer comprising an attenuation pattern that is disposed on the transparent layer, wherein the attenuation pattern spatially modulates four-dimensional (4D) acquired light field data such that the spatially modulated data includes wideband image information of a scene.

The attenuation pattern may comprise a plurality of unit patterns, and each unit pattern may comprise a pixel structure in which a first group of pixels block light, and a second group of pixels allow light to pass, and the number of pixels that block light and that allow light to pass may be adjustable.

The attenuation pattern may comprise a plurality of unit patterns, each unit pattern may comprise a 7×7 pixel structure, and the second and fourth rows of pixels and second and fourth columns of pixels of each unit pattern may block light and the remaining pixels of each unit pattern may not block light.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
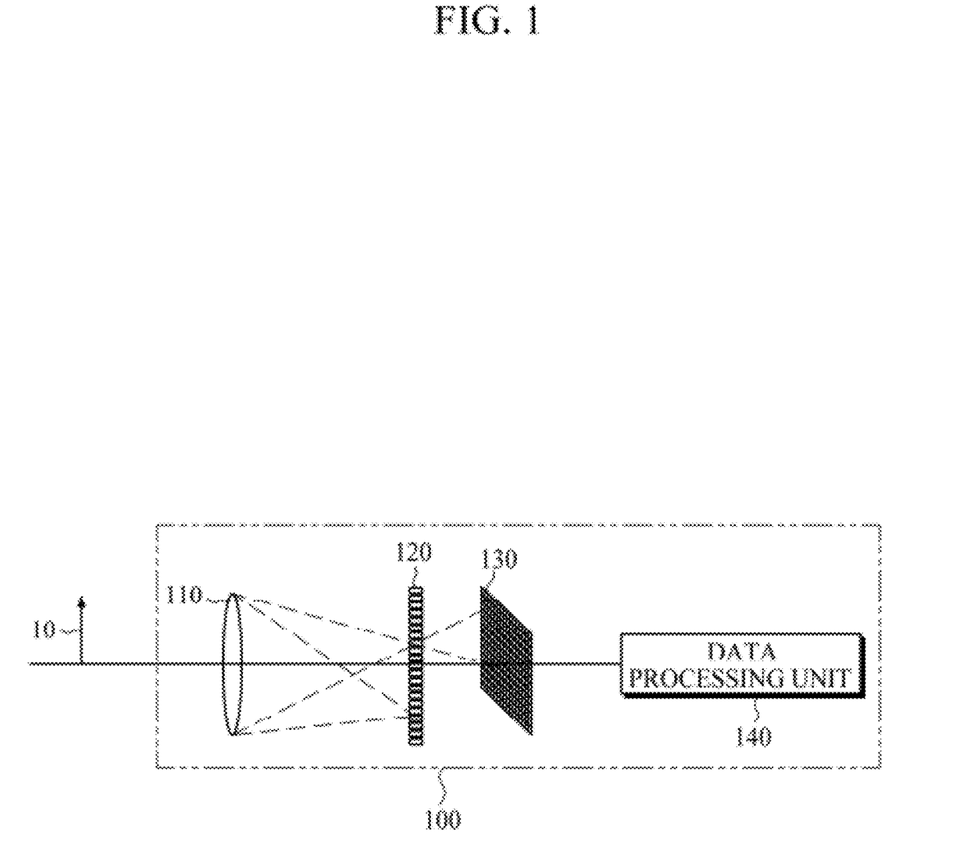
FIG. 1 is a diagram illustrating an example of an apparatus for processing a light field image.

FIG. 1 illustrates an example of an apparatus for processing a light field image (hereinafter, referred to as a light field image processing apparatus).

Referring to FIG. 1, light field image processing apparatus 100 includes a lens 110, a mask 120, a sensor 130, and a data processing unit 140. For example, the light field image processing apparatus 100 may be or may be included in a camera or various electronic products including the camera.

An image of an object 10 (or a scene including an object) passing through an optical device such as a lens 110 passes through the mask 120, and is acquired in the form of light field data at the sensor 130.

The mask 120 functions as a modulator to spatially modulate the four-dimensional (4D) light field data of the object 10. For example, the mask 120 may include an attenuation pattern that spatially modulates the 4D light field data. The mask 120 may be arranged along an optical axis. The mask 120 may be arranged between the lens 110 and the sensor 130. As another example, the mask 120 may be installed on the sensor 130.

The mask 120 may allow wideband information of the scene to be sensed. The mask used in conventional light field cameras is manufactured on the assumption that the mask includes a narrow-band light field, which renders it possible for the sensor 130 to acquire a two-dimensional (2D) image including high frequency components. Conversely, in various aspects described herein, the mask 120 may be formed such that the sensor 130 may detect wideband image information including the high frequency components of an image.

For example, the mask 120 may be formed with an attenuation pattern that has unit patterns that are repeatedly formed to attenuate light. The spatially varying modulation functions of the unit patterns forming the attenuation pattern of the mask 120 may have invertibility. By having invertibility the non-singular characteristics are satisfied when the spatially varying modulation function is represented by a matrix. For example, the invertibility of the spatially varying modulation function may be tested by the singular value decomposition.

The mask 120 may be formed such that at least half of the area of each unit pattern transmits light, thereby allowing the sensor 130 to sense the high frequency components of a scene. As described herein, the use of the mask 120, which is formed to allow the sensor 130 to sense the wideband information of the images, makes it possible to obtain information on the images to generate a high resolution image through an image processing procedure using the 2D image acquired from the sensor 130. As an example, the mask 120 may be a metal mask.

As described herein, for example, the mask 120 may spatially modulate 4D light field data of a scene such that the spatially modulated 4D light field data includes wideband image information of the scene. Accordingly, the sensor 130 may detect the wideband image information.

The sensor 130 may detect a 2D image corresponding to the spatially modulated 4D light field data. For example, the sensor 130 may include a plurality of pixel elements. The sensor 130 may acquire 2D signals of the spatially modulated 4D light field. The acquired light field signals may be stored in a predetermined storage space (not shown).

In the example shown in FIG. 1, the lens 110, the mask 120 and the sensor 130 may include a light field data acquisition device.

The data processing unit 140 may be a microprocessor or a digital signal processor that processes the detected image. For example, if a Fourier transform is applied to the 2D image acquired from the sensor 130 after the light field is spatially modulated by the mask 120, the information of the 2D image is transformed into a frequency domain. In this example, the light field data may be obtained by modifying the information of the 2D image transformed into the frequency domain into a 4D domain, and applying the inverse Fourier transform to the transformed 4D domain information.

This principle is similar to the following principle. In this principle, for example, a baseband signal is modulated into a high frequency signal using a carrier signal, and the modulated signal is transmitted a distance without energy loss. Then, a receiver demodulates the received signal to recover the baseband signal. The light field image data processing unit 140 recovers the 4D light field data from the 2D image. The 4D light field data becomes a demodulated image of the detected 2D image. In the case of the light field image processing apparatus 100, it should be understood that this principle is applied to an optical domain.

The following equation represents that the light field data that is modulated at the mask 120.

$$Y_S(f_x; f_\theta) = L(f_x; f_\theta) \otimes M(f_x; f_\theta)$$

In this example, $Y_S(f_x; f_\theta)$ represents a value observed by a sensor, $L(f_x; f_\theta)$ represents an original light field, and $M(f_x; f_\theta)$ represents the Fourier transform of a mask modulation function. Also in this example, $f_x$ represents a spatial frequency, $f_a$ represents an angular frequency, and $\otimes$ represents a convolution.

The data processing unit 140 may generate a depth map from the 4D light field data, and generate a high-resolution depth map based on the depth map. For example, the data processing unit 140 may generate an all-in-focus image based on the 2D image that is captured by the sensor 130 and the high-resolution depth map. Acquiring an all-in-focus image may be referred to as an operation of deblurring an image blurred by the mask 120. The all-in-focus image may be referred to as a full resolution image.

As another example, the data processing unit 140 may generate a traditional image that is focused at a certain depth through a reblurring process, based on the high-resolution depth map and the all-in-focus image. The data processing unit 140 may generate a high-resolution light field image based on the high-resolution depth map and the all-in-focus image. In this example, a light field camera may be realized using such a function.

By using the high-resolution light field image, the data processing unit 140 may generate a view image of a scene that is viewed from at least one angle, according to the conventional method of processing 4D light field data, and may further generate a re-focused image at different depths. The data processing unit 140 may process various kinds of images, for example, a 3D stereo image, based on a variety of view images, that is, based on multiple-viewpoint images. In this example, the re-focused images or the multiple-viewpoint images may have a higher resolution than the images that are generally acquired because they are generated using the light field data that has a higher resolution than the conventional light field data.

In various aspects, the light field image processing apparatus 100 may further include a display unit to display an image processed by the data processing unit 140, a communication unit to transmit an image to other electronic units, and the like.

In various aspects, the light field image processing apparatus 100 may select a traditional image output mode to output a traditional image and a light field image output mode to output a high-resolution light field image, for example, based on a user's mode selection, and may selectively output the traditional image and the high-resolution light field image.

Figure 2:
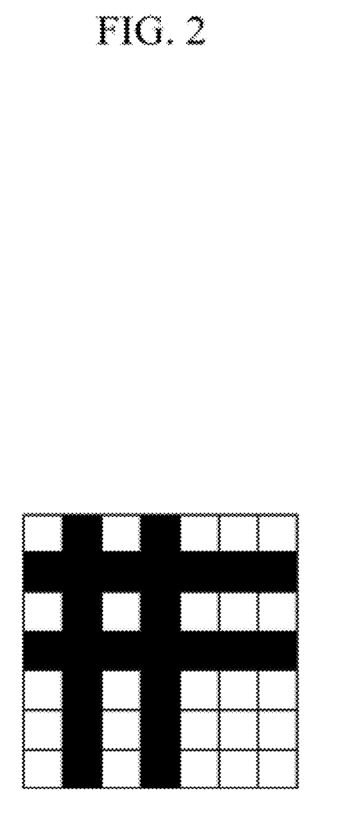
FIG. 2 is a diagram illustrating an example unit pattern of a mask.

FIG. 2 illustrates an example of a unit pattern of a mask.

Referring to FIG. 2, for example, the unit pattern of the mask 120 may have a 7×7 pixel structure. For example, the unit pattern of the mask 120 may be formed such that regions corresponding to second and fourth rows and second and fourth columns of the unit pattern intercept light and the other regions do not intercept the light. The mask 120 illustrated in FIG. 2 includes a unit pattern that is formed to generate information on the wideband image of a scene. It should be appreciated that various changes and modifications of the unit pattern may be made.

Figure 3:
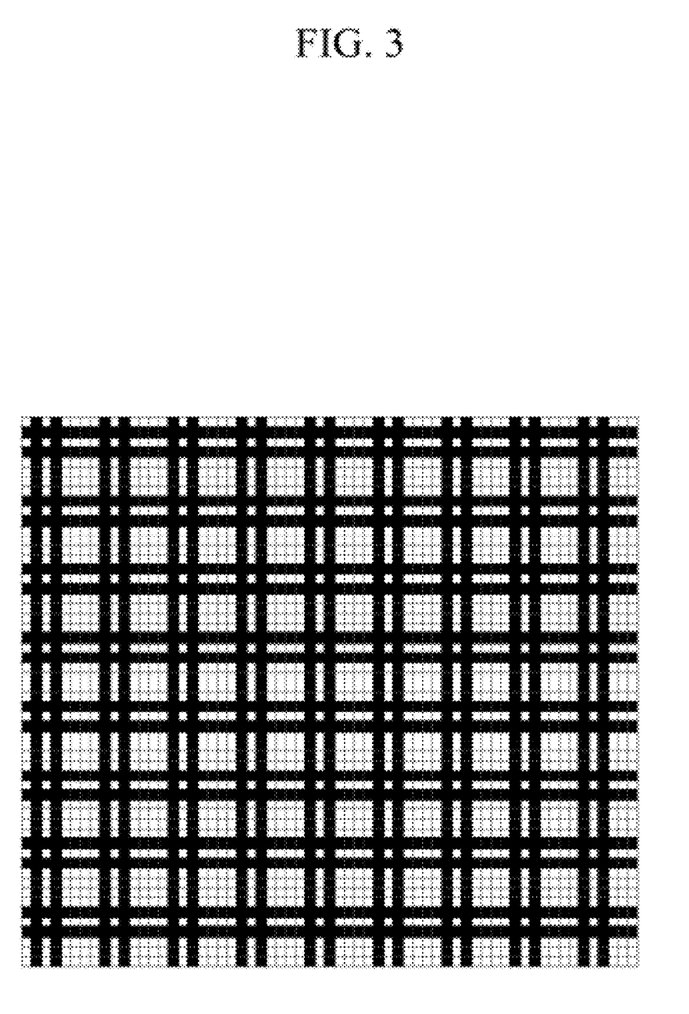
FIG. 3 is a diagram illustrating an example of a mask including unit patterns illustrated in FIG. 2.

FIG. 3 illustrates an example of a mask made up of unit patterns illustrated in FIG. 2.

As illustrated in FIG. 3, the mask 120 made up of the unit patterns of FIG. 2 makes it possible to acquire light field data that is spatially modulated to include information on the wideband images.

Figure 4:
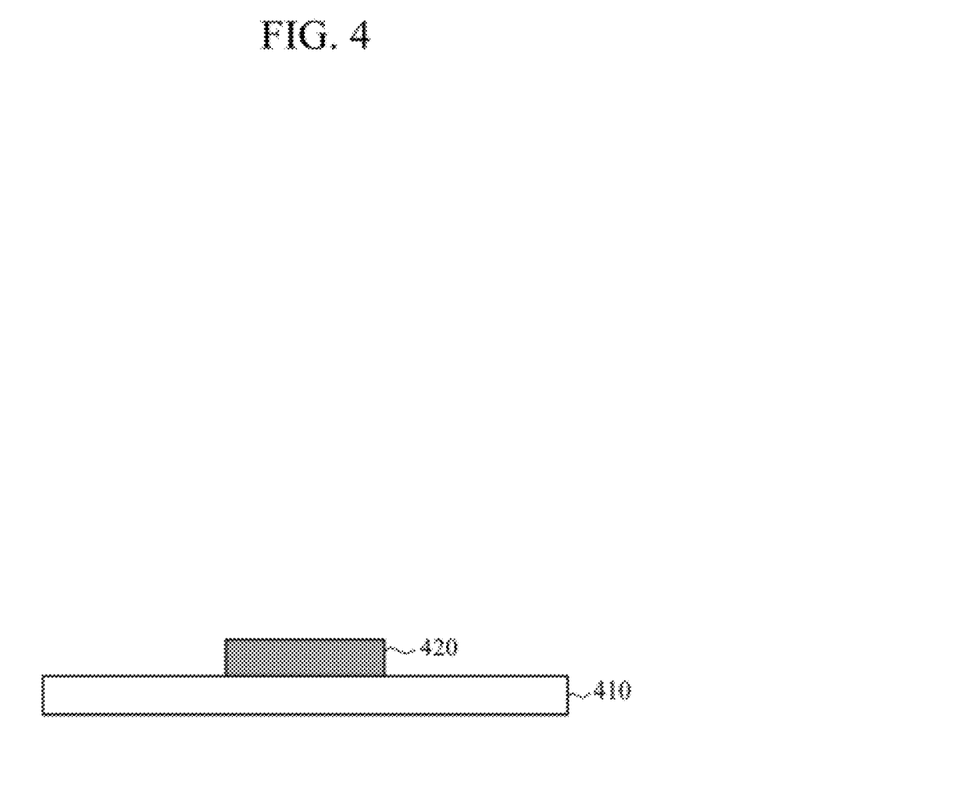
FIG. 4 is a cross-sectional view illustrating an example of a mask.

FIG. 4 illustrates an example of a cross-sectional view of a mask.

A method of treating a film with a chemical solution to form an attenuation pattern has been used in conventional methods. However, when the film and the chemical solution are used to form the attenuation pattern, it may be difficult to accurately form a fine pattern of micrometers (μm).

As an example, to manufacture a mask 120 that includes an attenuation pattern that has a more exact gray level representation and pattern, a metal mask manufactured by nano process technology may be used.

If the unit patterns forming the attenuation pattern are divided into a plurality of regions, the attenuation pattern may have a plurality of gray level values, based on the shielding level of a plurality of the divided regions.

The mask 120 may be a metal mask that includes a transparent layer 410 and a metal layer 420 that is disposed on the transparent layer 410. The metal layer 420 may have an attenuation pattern that is formed therein to attenuate the light passing through the transparent layer. For example, the transparent layer 410 may be made of glass, and the metal layer 420 may be formed by depositing chromium on the transparent layer 410. The mask 120 manufactured by such nano process technology may be used to improve the performance of the mask 120, and make it possible to acquire exact light field data.

Figure 5:
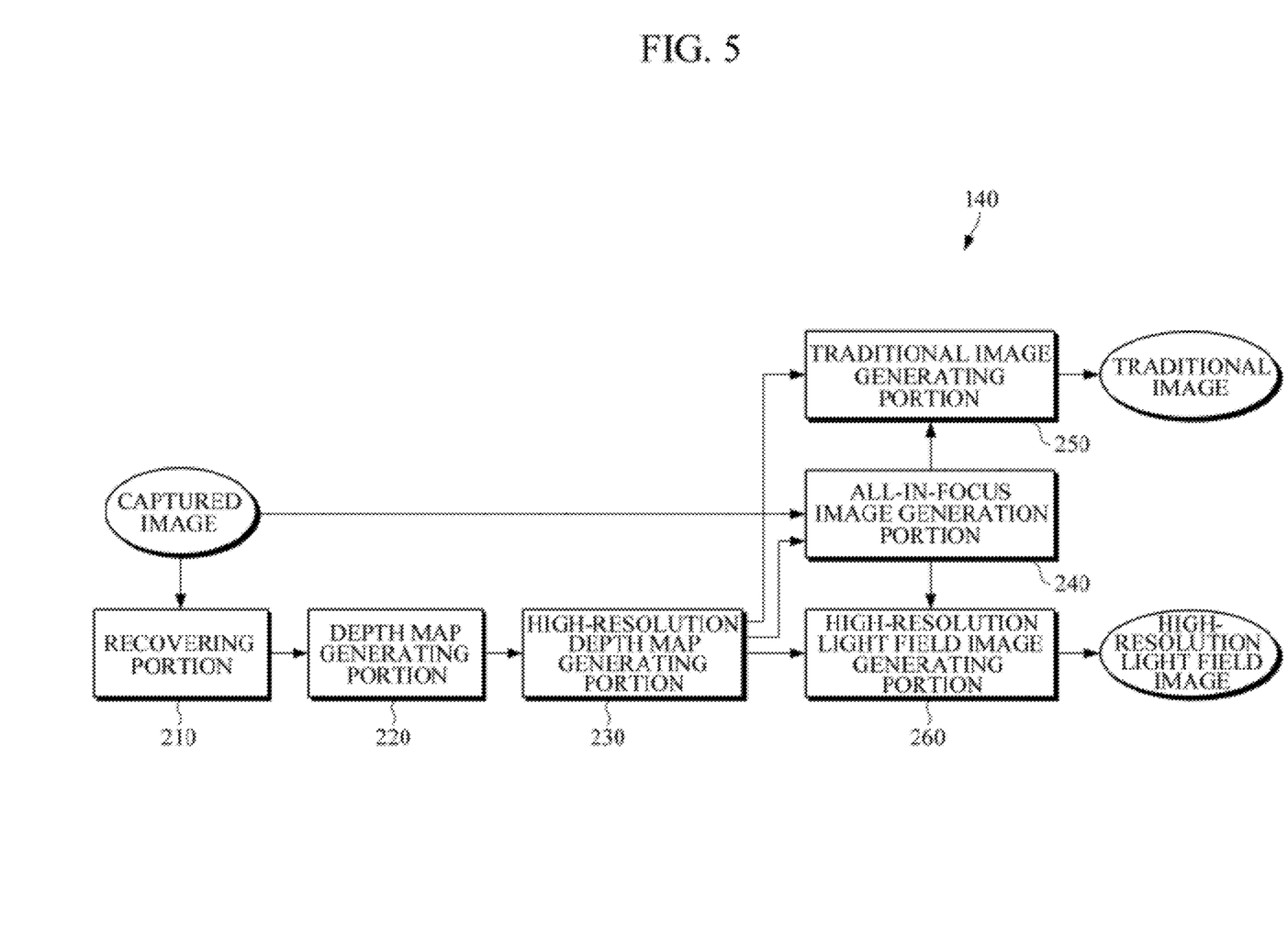
FIG. 5 is a diagram illustrating an example of a data processing unit that may be included in a light field image processing apparatus.

FIG. 5 illustrates an example of a data processing unit that may be included in a light field image processing apparatus.

Referring to FIG. 5, the data processing unit 140 includes a recovering portion 210, a depth map generating portion 220, a high-resolution depth map generating portion 230, an all-in-focus image generating portion 240, a traditional image generating portion 250, and a high-resolution light field image generating portion 260.

The recovering portion 210 may recover 4D light field data from a 2D image.

The depth map generating portion 220 may generate a plurality of viewpoint images from the recovered 4D light field data, and generate a depth map from a plurality of the viewpoint images.

The high-resolution depth map generating portion 230 may generate a high-resolution depth map with respect to the generated depth map. For example, the high-resolution depth map generating portion 230 may generate the high-resolution depth map by enlarging the generated depth maps to a predetermined size and interpolating information between the enlarged depth maps by an interpolation method, for example, a bilinear interpolation method, a bicubic interpolation method, and the like. The high-resolution depth map generating portion 230 may enlarge the generated depth maps based on a desired level of high resolution.

The all-in-focus image generating portion 240 may generate an all-in-focus image that is in focus in all positions based on the 2D image and the generated high-resolution depth map. For example, the all-in-focus image generating portion 240 may determine a spatially varying modulation function based on information of the high-resolution depth map and may generate the all-in-focus image based on an inverted value of the spatially varying modulation function and the 2D image.

The traditional image generating portion 250 may generate a traditional image that is focused at a certain depth through a reblurring process, based on the high-resolution depth map and the all-in-focus image. For example, the traditional image generating portion 250 may generate a traditional image by reblurring the all-in-focus image with reference to the high-resolution depth map using a predetermined blur kernel for pixel values of the pixels remaining except for the pixels that have depth information corresponding to the certain depth. An example of a predetermined blur kernel is a Gaussian function. The traditional image generating portion 250 may perform a reblurring process for the remaining pixels by setting a predetermined blur kernel such that the blur kernel is in proportion to the difference between the certain depth and the depth information.

The high-resolution light field image generating portion 260 may generate a high-resolution light field image based on the high-resolution depth map and the all-in-focus image. For example, the high-resolution light field image generating portion 260 may generate a high-resolution light field image by shifting the pixels of the all-in-focus image based on the information about the depths of the pixels included in the high-resolution depth map.

Hereinafter, the spatially varying modulation function of the mask 120, which is spatially modulated to recover the all-in-focus image, is further described with reference to FIGS. 6A to 6C.

Figure 6A:
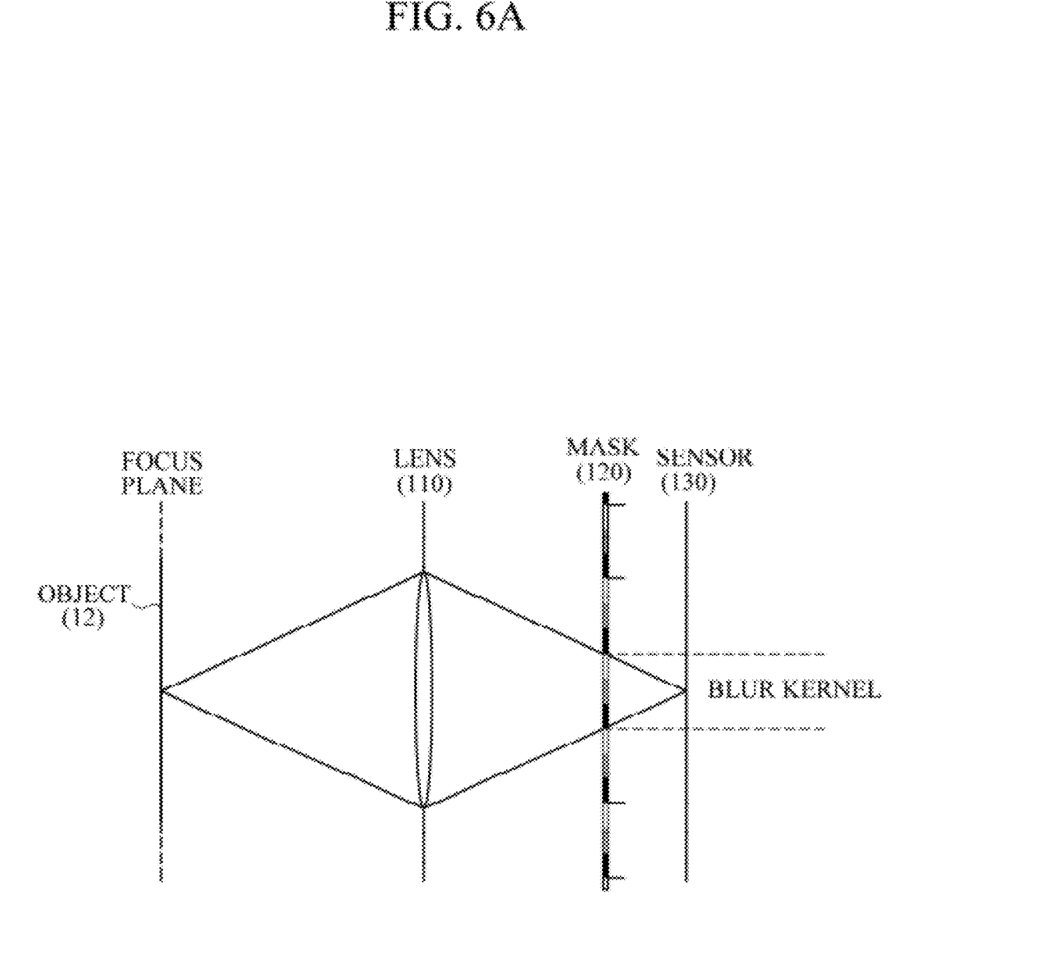
FIG. 6A is a diagram illustrating an example of an arrangement of image acquisition portions while an object is present on a focus plane.

FIG. 6A illustrates an example of an arrangement of image acquisition portions while an object is present on a focus plane.

Referring to FIG. 6A, an object 12 is present on a focus plane. This is an example of an in-focus condition. In this example, one point of the object 12 is encoded by the unit pattern of the mask 120, and put into one pixel of the sensor 130. In this example, a pattern of the mask 120, which has an effect on the one point of the object 12, is referred to as a unit pattern. For example, the unit pattern of the mask 120 may be determined as a spatially varying modulation function. In this example, information on the one point of the object 12 may be recovered with a value of the sensor 130 and an inverted value of the code corresponding to the mask 120.

Figure 6B:
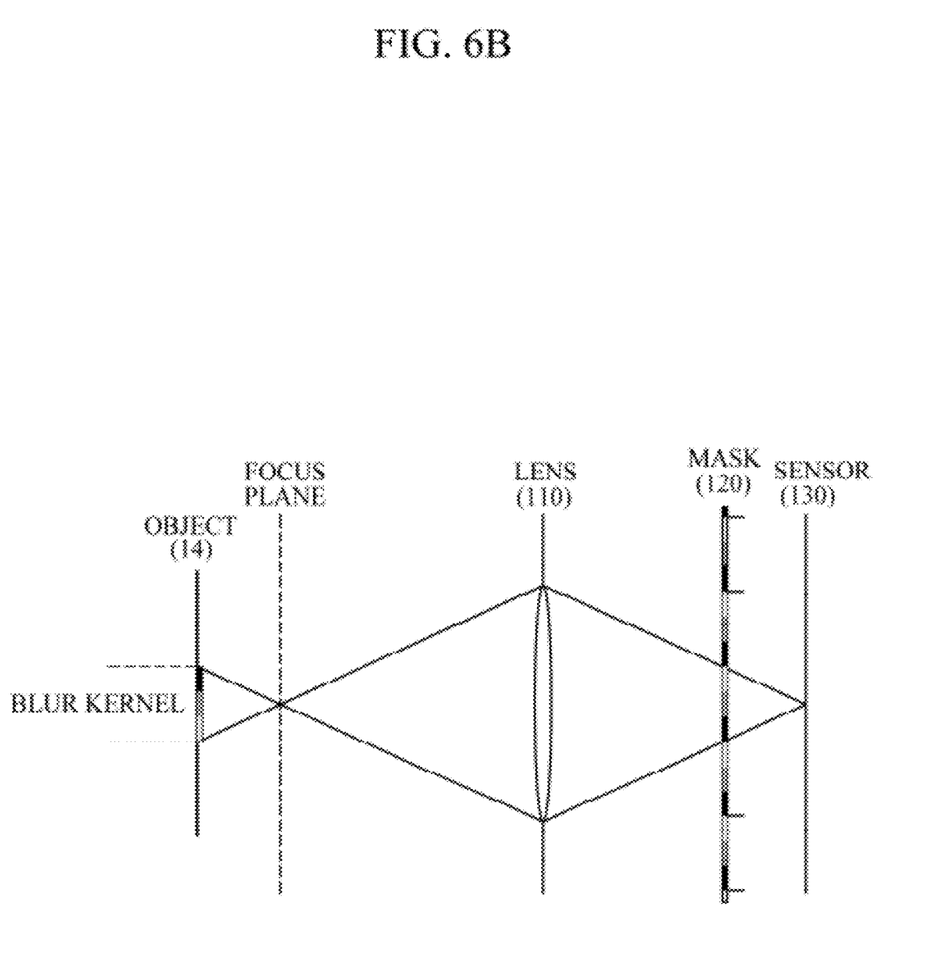
FIG. 6B is a diagram illustrating an example of an arrangement of image acquisition portions while an object is present in front of a focus plane.

FIG. 6B illustrates an example of an arrangement of image acquisition portions while an object is present in front of a focus plane.

Referring to FIG. 6B, an object 14 is present in front of a focus plane. This is an example of an in-front-focus condition. In this example, several points of the object 14 may have an effect on one pixel of the sensor 130. The pattern size of the mask 120 that spatially modulates a scene including the object 14 may be determined by the distance between the sensor 130 and the object 14. For example, the spatially varying modulation function of the mask 120 that spatially modulates the scene including the object 14 may be varied. In this example, the spatially varying modulation function may be considered to be a blur kernel.

In this example, because the patterns on which the mask 120 has an effect are repeated based on the distance to the object, the light field data on the object 14 is circularly convoluted with patterns on which the mask 120 has an effect, and then detected by the sensor 130.

Figure 6C:
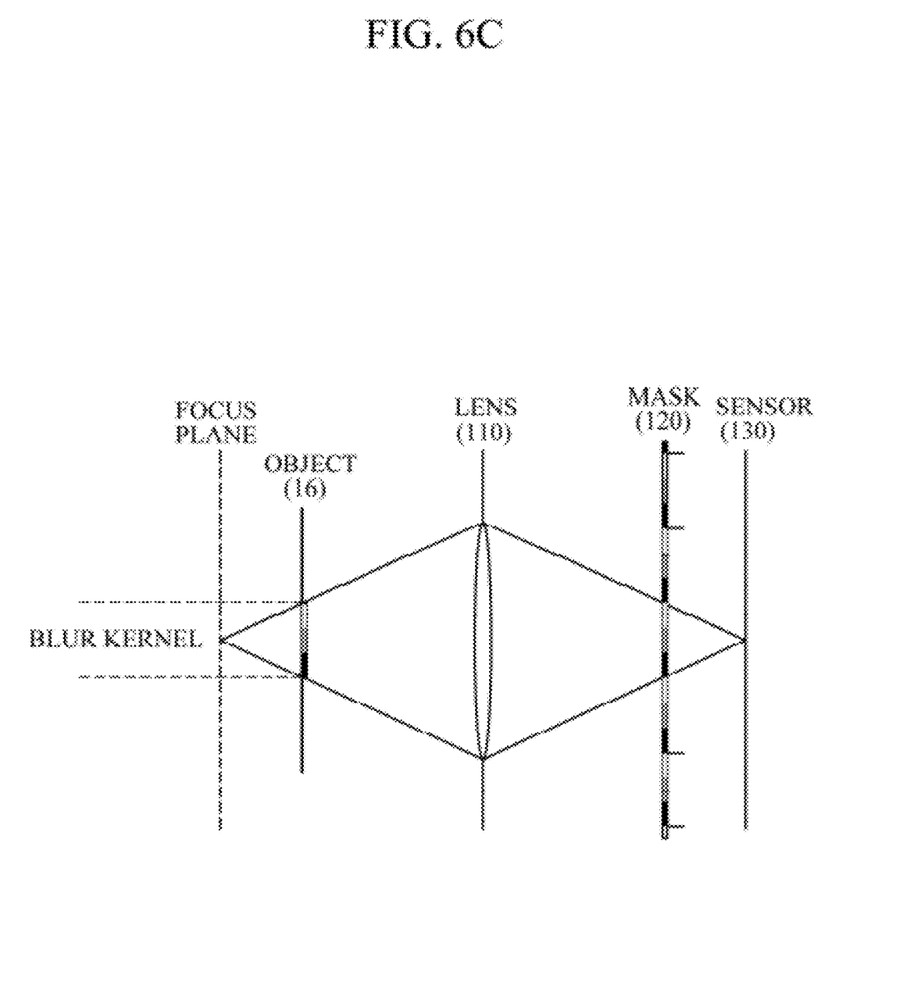
FIG. 6C is a diagram illustrating an example of an arrangement of image acquisition portions while an object is present in the rear of a focus plane.

FIG. 6C illustrates an example of an arrangement of image acquisition portions while an object is present in the rear of a focus plane.

Referring to FIG. 6C, an object 16 is present in the rear of a focus plane. This is an example of a behind focus-condition. In this example, several points of the object 16 may have an effect on one pixel of the sensor 130 in the same manner as in the in-front focus condition. For example, a spatially varying modulation function of the mask 120 that spatially modulates a scene including the object 16 may be varied based on the distance between the sensor 130 and the object 16.

However, a pattern of the mask 120 that spatially modulates the scene including the object 16 may undergo a situation in which the pattern of the mask 120 is changed up and/or down, and left and/or right in the case of the in-front focus condition illustrated in FIG. 6B.

As described above, the spatially varying modulation function of the mask 120 that spatially modulates an image of the scene representing the object 12, 14, and 16 may be varied based on the positions of the objects 12, 14 and 16. Accordingly, the all-in-focus image generating portion 240 may determine the spatially varying modulation function, based on the information on the high-resolution depth map, and generate an all-in-focus image based on an inverted value of the spatially varying modulation function and the 2D image.

Figure 7:
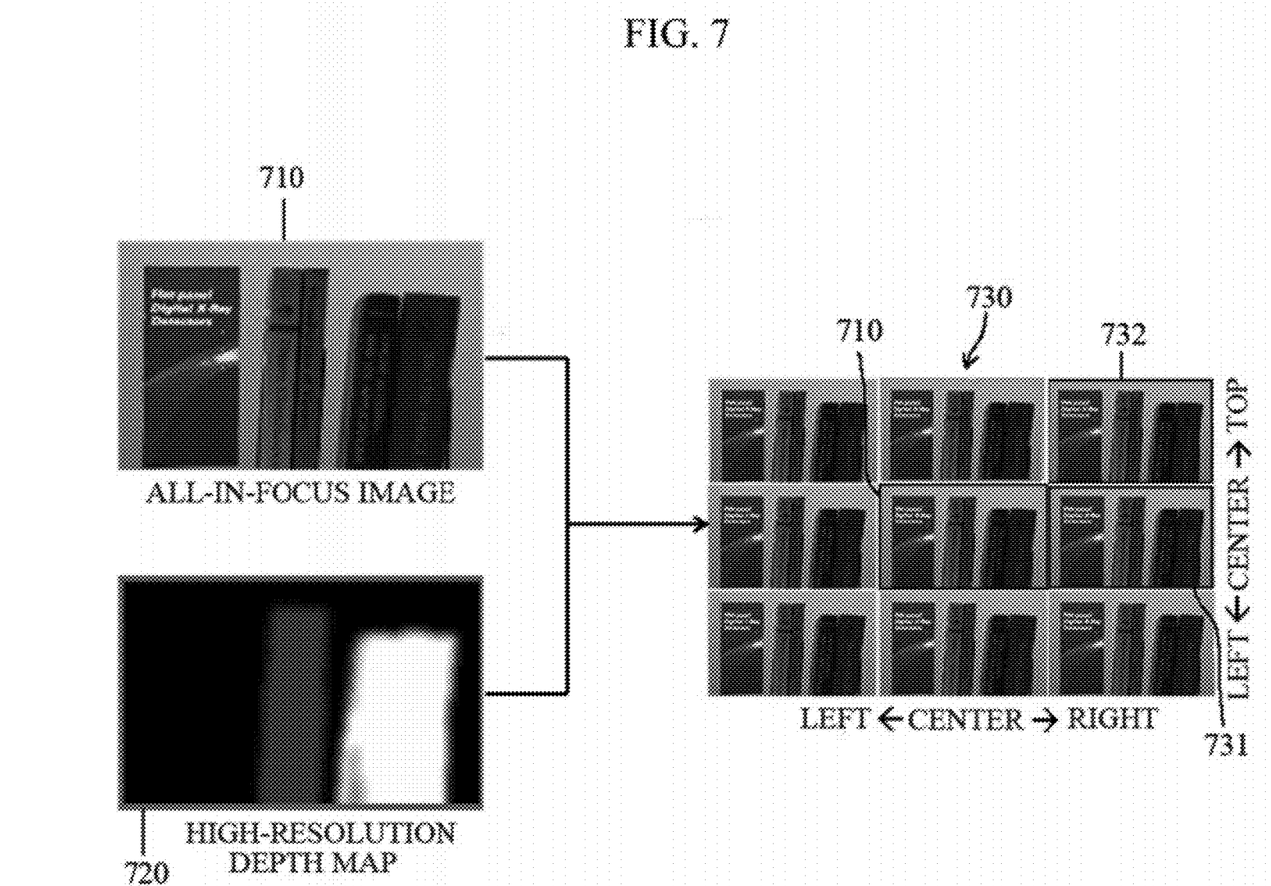
FIG. 7 is a diagram illustrating an example of generating a high-resolution light field image based on an all-in-focus image and a high-resolution depth map.

FIG. 7 illustrates an example of generating a high-resolution light field image based on an all-in-focus image and a high-resolution depth map.

Referring to FIG. 7, image 710 represents an all-in-focus image, and image 720 represents a high-resolution depth map for the image 710. As described herein, the high-resolution light field image generating portion 260 may generate a high-resolution light field image by shifting pixels of the all-in-focus image based on the information about the depths of the pixels included in the high-resolution depth map.

For example, the depth map 720 may have three kinds of depth information. In this example a white region in the high-resolution depth map 720 has first depth information that is closest to the light field image processing apparatus 100 (or the sensor 130), a grey region has second depth information that is higher than the first depth information, and a black region has third depth information that is farthest from the light field image processing apparatus 100 (or the sensor 130).

The high-resolution light field image generating portion 260 may generate a multiple-viewpoint image by shifting the pixels by region, for example, based on the depth information of the high-resolution depth map 720, while the all-in-focus image 710 is located in the middle. For example, a pixel shift level may be determined so that it can be in proportion to the depth information, and the pixel shift level may be determined by experiment according to the depth information. For example, the white region that has the first depth information in the high-resolution depth map 720 may be shifted by 1 pixel unit, the grey region that has the second depth information may be shifted by 1.2 pixel units, and the black region that has the third depth information may be shifted by 1.5 pixel units.

In this example, image 730 represents a high-resolution light field image that is generated using the all-in-focus image 710 and the high-resolution depth map 720. For example, the high-resolution light field image 730 may be generated with the 9 images, and they may be generated by the pixel shifting of the all-in-focus image 710 and the all-in-focus image 710. The 9 generated images represent multiple-viewpoint images as the scene of the all-in-focus image 710 is viewed in different viewpoints.

For example, image 731 may be generated as it is shifted by 1 pixel from the all-in-focus image 710 to the right with respect to the white region of the high-resolution depth map 720, shifted by 1.2 pixels to the right with respect to the grey region, and then shifted by 1.5 pixels to the right with respect to the black region. As another example, image 732 may be generated as it is shifted by 1 pixel from the all-in-focus image 710 to the right and top with respect to the white region, shifted by 1.2 pixels to the right and top with respect to the grey region, and then shifted by 1.5 pixels to the right and top with respect to the black region.

Figure 8:
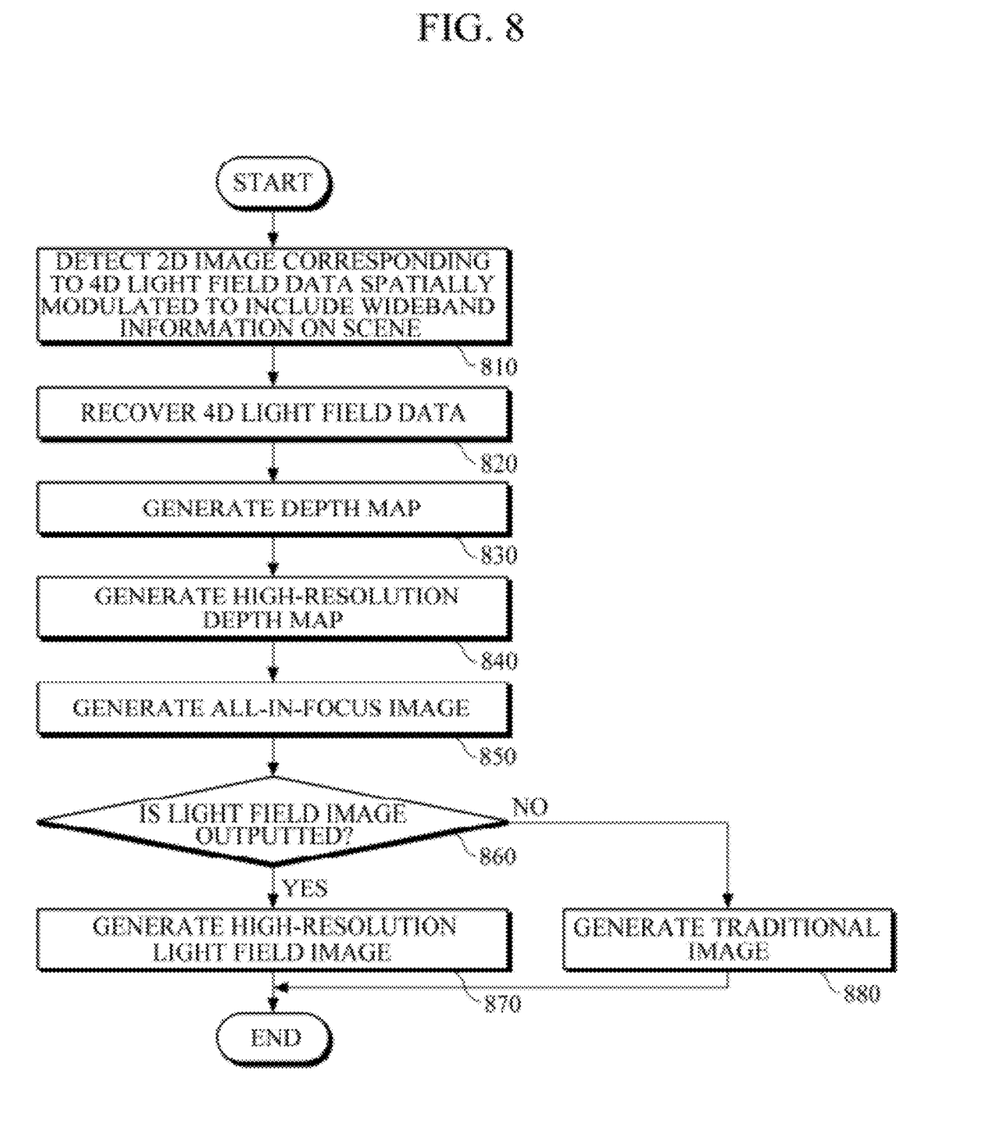
FIG. 8 is a flowchart illustrating an example of a method of processing a light field image.

FIG. 8 illustrates an example of a method of processing a light field image.

Referring to FIG. 8, a light field image processing apparatus detects a 2D image corresponding to the 4D light field data, which is spatially modulated to include wideband information of a scene, in 810.

The light field image processing apparatus recovers the 4D light field data from the 2D image, in 820.

The light field image processing apparatus generates a depth map from the 4D light field data, in 830, and generates a high-resolution depth map with respect to the depth map, in 840.

The light field image processing apparatus generates an all-in-focus image based on the detected 2D image and the high-resolution depth map, in 850. For example, the light field image processing apparatus may determine a spatially varying modulation function based on the information on the high-resolution depth map, and generate an all-in-focus image using an inverted value of the spatially varying modulation function and the 2D image.

The light field image processing apparatus is operable in a traditional image output mode to output a traditional image and in a light field image output mode to output a high-resolution light field image.

If the high-resolution light field image output mode is selected by the user input signals based on the other mode selection signals, in 860, the light field image processing apparatus may generate a high-resolution light field image based on the high-resolution depth map and the all-in-focus image, in 870.

For example, the light field image processing apparatus may input additional user input signals or sub-modes in the light field image output mode, for example, a re-focusing image output mode, a view variation mode, and the like. As another example, the light field image processing apparatus may output a higher-resolution re-focusing image, compared to the images which may be acquired using the conventional light field cameras, by acquiring a high-resolution light field image to perform a re-focusing function by changing a focus plane or output a higher-resolution multiple-viewpoint image by performing a view variation function in which the user experiences a view of a scene from various angles, based on the user input signals.

If the traditional image output mode is selected by the user input signals or based on the other mode selection signals, the light field image processing apparatus generates a traditional image in 880. For example, the traditional image may be focused at a certain depth through a reblurring process, based on the high-resolution depth map and the all-in-focus image.

Various aspects are directed towards an apparatus and method for processing a light field image that are capable of acquiring light field data using a mask that includes an attenuation pattern and acquiring a high-resolution light field image and a traditional image using the light field data.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing a light field image, the apparatus comprising:
   a lens;
   a mask configured to spatially modulate four-dimensional (4D) light field data of a scene passing through the lens such that the spatially modulated 4D light field data includes wideband information of the scene, the mask comprising
      a transparent layer, and
      a metal layer disposed on the transparent layer, the metal layer comprising
         an attenuation pattern configured to attenuate light passing through the transparent layer;
   a sensor configured to detect a two-dimensional (2D) image corresponding to the spatially modulated 4D light field data; and
   a data processing unit configured to recover the 4D light field data from the 2D image, generate a high-resolution depth map based on the 4D light field data, and generate an all-in-focus image based on the 2D image and the high-resolution depth map,
   wherein the attenuation pattern comprises unit patterns, each unit pattern comprises a 7×7 pixel structure, and each region in the second and fourth rows and second and fourth columns of the unit patterns are configured to intercept light.

2. The apparatus of claim 1, wherein the data processing unit comprises:
   a recovering portion configured to recover the 4D light field data from the 2D image;

a depth map generating portion configured to generate a plurality of viewpoint images from the 4D light field data and generate a depth map from a plurality of the viewpoint images;

a high-resolution depth map generating portion configured to generate a high-resolution depth map with respect to the depth map; and an all-in-focus image generating portion configured to generate an all-in-focus image which is focused in all positions based on the 2D image and the generated high-resolution depth map.

3. The apparatus of claim 2, wherein the all-in-focus image generating portion determines a spatially varying modulation function based on the high-resolution depth map, and generates an all-in-focus image based on an inverted value of the spatially varying modulation function and the 2D image.

4. The apparatus of claim 2, wherein the data processing unit further comprises a traditional image generating portion configured to generate a traditional image that is focused only at a certain depth through a reblurring process, based on the high-resolution depth map and the all-in-focus image.

5. The apparatus of claim 2, wherein the data processing unit further comprises a high-resolution light field image generating portion configured to generate a high-resolution light field image based on the high-resolution depth map and the all-in-focus image.

6. The apparatus of claim 5, wherein the high-resolution light field image generating portion generates a high-resolution light field image by shifting pixels of the all-in-focus image based on the depths of the pixels included in the high-resolution depth map.

7. The apparatus of claim 1, wherein the spatially varying modulation functions of the unit patterns forming the attenuation pattern have non-singular characteristics, and the unit patterns are formed such that at least half of the area of each unit pattern transmits light.

8. A method of processing a light field image, the method comprising:

detecting a two-dimensional (2D) image corresponding to four-dimensional (4D) light field data that is spatially modulated to include wideband information of a scene, using a mask configured to spatially modulate the 4D light field data of the scene and a sensor;

recovering the 4D light field data from the 2D image;

generating a high-resolution depth map based on 4D light field data; and generating an all-in-focus image using the 2D image and the high-resolution depth map, wherein the mask comprises a transparent layer and a metal layer disposed on the transparent layer, the metal layer comprising an attenuation pattern configured to attenuate the light passing through the transparent layer, and the attenuation pattern comprises unit patterns, each unit pattern comprises a 7×7 pixel structure, and each region in the second and fourth rows and second and fourth columns of the unit patterns are configured to intercept light.

9. The method of claim 8, wherein the generating of the all-in-focus image comprises:

determining a spatially varying modulation function based on the high-resolution depth map; and generating an all-in-focus image based on an inverted value of the spatially varying modulation function and the 2D image.

10. The method of claim 8, further comprising generating a traditional image that is only focused at a certain depth through a reblurring process, based on the high-resolution depth map and the all-in-focus image.

11. The method of claim 8, further comprising generating a high-resolution light field image based on the high-resolution depth map and the all-in-focus image.

12. The method of claim 11, wherein the generating of the high-resolution light field image further comprises generating a high-resolution light field image by shifting pixels of the all-in-focus image based on the depths of the pixels included in the high-resolution depth map.

13. An attenuation mask of an imaging apparatus, the attenuation mask comprising:

a transparent layer; and a metal layer disposed on the transparent layer, wherein the attenuation mask is configured to spatially modulates four-dimensional (4D) acquired light field data such that the spatially modulated data includes wideband image information of a scene, the metal layer comprising an attenuation pattern configured to attenuate light passing through the transparent layer, and the attenuation pattern comprises unit patterns, each unit pattern comprises a 7×7 pixel structure, and each region in the second and fourth rows and second and fourth columns of the unit patterns are configured to intercept light.

* * * * *